3,485,577
REMOVAL OF FREE CHLORINE FROM RESIDUAL CHLORINATION GASES

Philip B. Kraus, Landenberg, Pa., assignor to E. I. du Pont de Nemours and Company, Wilmington, Del., a corporation of Delaware
No Drawing. Filed Nov. 14, 1966, Ser. No. 593,647
Int. Cl. B01d 57/00; C07b 9/00
U.S. Cl. 23—2         9 Claims

ABSTRACT OF THE DISCLOSURE

This invention pertains to a process of removing free chlorine from residual tail gases formed in a chlorination of titaniferous ore at temperatures ranging from 400 to 1300° C. by reacting the free chlorine in the presence of $CO_2$ with a stoichiometric amount of a low molecular weight hydrocarbon having the formula $C_nH_{2n+2}$ wherein $n$ is 1 to 4.

---

This invention relates to the prevention of free chlorine release to the atmosphere from residual tail gases formed in a chlorination operation. More specifically, it relates to the reduction of the free chlorine content of a gas stream leaving a titaniferous ore chlorination furnace at temperatures ranging at 400–1300° C. by reacting the chlorine in the presence of $CO_2$ with a stoichiometric amount of a low molecular weight gaseous hydrocarbon, such as methane.

The chlorination process commonly employed in the chemical industries is usually an intermediate step in purifying an ore or other oxidic substance of an element to obtain a chloride of the element, e.g. $TiCl_4$, $ZrCl_4$, $SiCl_4$, $AlCl_3$, $SnCl_4$ etc. Among known chlorination methods for such production, those disclosed in U.S. Patents No. 1,179,394, 1,529,319, 1,878,013, 2,701,179, and 2,953,513 can be mentioned. In its simplest form, the chlorination is usually undertaken by introducing a charge of the ore, consisting of oxides of the desired element as well as lesser quantities of impurity oxides, along with a carbonaceous reducing agent, such as carbon, into a suitable chlorination vessel. The reducing agent functions as a source of heat to sustain the reaction and also combines with the oxygen released from the ore. The bed of carbon and ore is then heated to the desired chlorination temperature, whereupon chlorine gas is introduced into the vessel and the chlorine atoms replace the oxygen atoms to form clorides of the various ore elements. Oxygen released from the ore combines with carbon to form CO and $CO_2$ and evolves heat in the process, leaving the equilibrium of the reaction zone favorable to a high chloride yield. The resulting gaseous reaction products are removed from the reactor along with $CO_2$, CO and unreacted chlorine for passage to a separation system wherein they are cooled and condensed and recovery effected of the desired chloride products. The exhaust gases from the separation stage are commonly referred to as "tail gases". Typically, such gases largely consist of inert purges, such as $N_2$, $CO_2$, CO and uncondensed chlorides. When excess chlorine or local conditions exist within the chlorination furnace which are not conductive for complete reaction, up to 2% of free chlorine also will be present in the gases. This free chlorine is objectionable because chlorine is only slightly soluble in water (Chlorine, Its Manufacture, Properties and Uses, ACS Monograph 154, pages 27–28) and is not removed on passage and contact of the gas with water in a fume scrubber disposal system to remove uncondensed chlorides. Consequently, the chlorine is vented with the gas to the atmosphere and is subsequently reduced to a chloride by combining with certain organic matter. Since the chlorination of organic matter is deleterious to plant tissue growth, the prevention of free chlorine release to the atmosphere is a primary object and purpose of this invention.

It has now been found that if a low molecular weight gaseous hydrocarbon, such as methane, is directly intermingled with a free chlorine-containing gas stream being discharged at temperatures ranging from 400–1300° C. from a chlorinator, interaction will take place between the hydrocarbon and chlorine under the prevailing gas outlet temperatures, pressures and concentrations to reduce and convert the free chlorine to a soluble chloride adapted to be readily removed from the gas prior to its release to the atmosphere.

In a more specific and preferred application the invention comprises removing the free chlorine content of a $CO_2$ containing gas stream being discharged from a chlorinator at temperatures ranging from about 800–1000° C. by injecting or otherwise incorporating in said gas about 0.5 moles of $CH_4$ per mole of $Cl_2$ present, whereby said free chlorine will be converted to a water-soluble chloride in accordance with the following equation:

$$2\ Cl_2 + CH_4 + CO_2 \rightarrow 4\ HCl + 2\ CO,$$

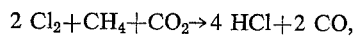

and thereafter scrubbing the chloride thus formed from the gas prior to releasing the latter to the atmosphere.

The invention will be described as particularly applied to the removal of free chlorine from a gas stream being exhausted from a fluidized bed chlorination in the presence of a reducing agent, of a titaniferous material, such as ilmenite ore, in accordance with, for example, the process disclosed in U.S. 2,701,179. In such process a finely ground mixture of a powdered carbonaceous reducing agent, such as carbon, coke or coal, and a finely ground oxidic material such as ilmenite, can be continuously fed to a reaction zone of a vertical elongated shaft or other type chlorination furnace and reacted therein while in fluidized bed suspension with gaseous chlorine at temperatures ranging above 700° C. to about 1250° C., and preferably at from 850–1000° C. Maintenance of the reactants in fluidized state and as a bed suspension in the lower portion of the reaction chamber is brought about by passing the gaseous chlorine reactant upwardly through the mixture and chamber. Gaseous products of reaction containing the chlorides of titanium, iron, vanadium and other elements present in the titaniferous material chlorinated, along with free, unreacted $Cl_2$, $CO_2$, CO and (if air is used) $N_2$ are withdrawn from the chlorinator at about 800–1000° C. and a stoichiometric quantity of a hydrocarbon reducing agent, such as methane, is injected into or otherwise admixed with said gases to convert their free chlorine content to a soluble chloride form. Thereafter, the chlorine-freed gas stream is passed to condensing equipment wherein the various chlorides are removed and the tail gases which now contain some uncondensed chlorides, CO, $CO_2$, and $N_2$ are washed in a conventional gas absorption scrubber system. The remaining non-reactive chlorine-free gases are vented to the atmosphere.

To a clearer understanding of the invention the following illustrative examples are given. These are not to be considered as limiting the underlying principles and scope of the invention.

EXAMPLE I

In this example treatment and reaction of a gaseous free-chlorine, $TiCl_4$–$FeCl_3$ containing gas stream at 700–800° C. with natural gas ($CH_4$) is undertaken. Such stream issues from the outlet of a chlorination furnace wherein ilmenite mixed with carbon is chlorinated in fluidized bed suspension with gaseous chlorine and in accordance with the disclosure of U.S. 2,701,179. In association with such chlorinator gas outlet are suitable means for continuously or intermittently introducing the natural gas reactant into the gas stream. These include a pressure reducing valve, pressure gauge and thermometer so that the natural gas addition could be measured by means of a flow meter. In addition a conventional analyzer instrument to detect and report the presence of compounds or elements which selectively absorb ultraviolet or visible light in 210–1000 millimicron range was provided in the system. This was located at a point just prior to entry of the tail gases into the fume scrubber system and served to determine the effect of natural gas addition on the concentration of free chlorine in the exhaust gas stream being tested.

In conducting the test, flows to the chlorinator were intentionally unbalanced (use of excess $Cl_2$) to provide a free chlorine excess in the outlet gas of 0.9 mole percent. The conditions for producing this imbalance were maintained constant during methane addition and for an additional 30 minutes thereafter. The amount of methane added was 0.25 mole percent of the exhaust gas stream rate for a 30 minute period. At the end of this period, the chlorine level, as shown by the photometric analyzer, had dropped to 0.4 percent chlorine. Twenty-two minutes after stoppage of methane addition the chlorine level of the exhaust gas was found to have risen to 0.9 mole percent. Thirty minutes after such stoppage, the chlorine analyzer revealed 1.2 mole percent as the equilibrium chlorine level in the exhaust gas stream. By interpolating between the starting level of chlorine at 0.9 mole percent and the final level of 1.2 mole percent, the chlorine level leaving the chlorinator, when measured at a point upstream of methane addition, was between 0.9 and 1.0 mole percent during the period of methane addition. From this test it was evident that the chlorine present in the gas was reduced to the chloride by methane addition and that such reduction was essentially stoichiometric, as evidenced by the 0.5 mole percent reduction of chlorine obtained by the addition of 0.25 mole percent methane.

The following Table 1 shows the time sequence employed in the above test and the corresponding chlorine analysis, as recorded on the analyzer:

TABLE 1

| Time | Comments | $Cl_2$ (mole percent) |
| --- | --- | --- |
| 8:00 A.M. | Start of Test | 0.1 |
| 8:30 | Furnace conditions unbalanced to increase $Cl_2$ Content of Tail Gas. | 0.1 |
| 9:00 | | 0.1 |
| 9:30 | | 0.2 |
| 10:00 | | 0.3 |
| 10:30 | | 0.6 |
| 11:00 | | 1.0 |
| 11:15 | $CH_4$ on | 0.9 |
| 11:30 | | 0.8 |
| 11:45 | $CH_4$ off | 0.4 |
| 12:00 | | 0.6 |
| 12:22 | Furnace conditions balanced | 1.2 |
| 12:30 | | 1.1 |
| 1:00 | | 0.6 |
| 1:30 | | 0.2 |
| 2:00 | | 0.1 |
| 2:30 | End of test | 0.1 |

EXAMPLE II

A second test involving addition of methane to a gas stream of substantially the same composition as that employed in Example I was undertaken in this example. The test gas was produced by the process and apparatus employed in Example I and through the chlorination of a titaniferous material in the presence of a carbonaceous reducing agent. Suitable facilities were provided in the chlorinator outlet to effect the addition of natural gas to the hot gaseous stream leaving the chlorinator outlet with the stream being at between 600–650° C. at the point of methane addition. A suitable orifice was provided in the outlet for measuring natural gas addition. A photometric analyzer was used for monitoring the free chlorine gas in the gas stream. This analyzer was located at a point in the system which enabled analysis of the gas stream just prior to its entry into the fume scrubber. By means of this instrument the effect of natural gas addition on the concentration of free chlorine in the exhaust gas stream was readily determined.

In conducting this test, flows to the chlorinator were intentionally unbalanced as in Example I so that a chlorine excess of 0.9 mole percent existed in the gas issuing from the chlorinator outlet. Such conditions of unbalance were maintained constant for 3 hours and 20 minutes, during which time, methane flow into the gas stream was intermittently maintained. Each time the chlorine level was lowered to a 0.2 to 0.4 mole percent chlorine range, as shown by the photometric analyzer. Then the chlorine level was raised to 1.8 mole percent and in approximately fifteen minutes such chlorine level, as shown by the photometric analyzer, had decreased to zero.

It was determined from this test that the chlorine present in the gas became reduced to the chloride by methane addition, and that the chlorine concentration reduced to zero upon addition of sufficient methane to the gas stream. Table 2 below shows the time sequence used in this test and corresponding $Cl_2$ analysis on the analyzer:

TABLE 2

| Time | Comments | Mole percent, $Cl_2$ |
| --- | --- | --- |
| 8:00 A.M. | Test started | 0.1 |
| 8:15 | Furnace conditions unbalanced | 0.1 |
| 9:10 | $CH_4$ on | 0.9 |
| 9:40 | $CH_4$ off | 0.1 |
| 9:50 | $CH_4$ on | 0.6 |
| 10:00 | $CH_4$ off | 0.2 |
| 11:10 | $CH_4$ on | 0.6 |
| 11:40 | $CH_4$ off | 0.2 |
| 11:50 | $CH_4$ on | 0.8 |
| 12:15 | $CH_4$ off | 0.3 |
| 12:20 | $CH_4$ on | 1.8 |
| 12:30 | $CH_4$ off | 0.0 |

While methane in specific quantity has been mentioned as a preferred form of reducing agent, the invention is not limited to such agent or amount. Methane is preferred because (a) it is more economical and readily available, being the chief ingredient of marsh gas; (b) its reaction with free chlorine is essentially stoichiometric for a typical chlorinator exhaust gas stream and results near 100% efficiency; and (c) with its use no undesired side reaction results and no yield losses of primary products are incurred. Generally use is contemplated of gaseous reducing agents selected from hydrogen and low molecular weight gaseous hydrocarbons, or their mixtures, which hydrocarbons correspond to the formula $C_nH_{2n+2}$ in which n is 1–4 (methane, ethane, propane, butane). The amounts of reducing agent used can vary. Usually, sufficient hydrogen or gaseous hydrocarbon is employed to provide from 2 to 4 atoms of hydrogen per mole of chlorine, and preferably the hydrogen or gaseous hydrocarbon provides 2 atoms of hydrogen per mole of chlorine. In instances of propane or butane use, more $CO_2$ will be required, as shown by the following equations:

(a) $4Cl_2 + C_3H_8 + 3CO_2 \rightarrow 8HCl + 6CO$
(b) $5Cl_2 + C_4H_{10} + 4CO_2 \rightarrow 10HCl + 8CO$ As will be evident, the invention can be applied to the treatment of various free chlorine-containing gases, being especially useful in the treatment of exhaust gases from a chlorination furnace which would otherwise ultimately vent objectionable free chlorine to the atmosphere. It will be found essential in the invention that during treatment the gas stream shall be within a 400–1300° C. temperature range, and preferably at from 800–1300° C.

I claim:
1. A method for removing free chlorine from a gaseous reaction product which comprises reacting said product in the presence of $CO_2$ at temperatures ranging from 400 to 1300° C. with a gaseous low molecular weight hydrocarbon corresponding to the formula $C_nH_{2n+2}$ wherein $n$ is 1 to 4.
2. The process of claim 1 in which the gaseous reaction product results from the chlorination of a titaniferous ore.
3. The process of claim 2 in which the gaseous reaction product is at a temperature ranging from 800–1000° C.
4. The process of claim 1 in which the gaseous hydrocarbon is methane.
5. The process of claim 2 in which the gaseous hydrocarbon is natural gas.
6. The process of claim 1 in which the amount of gaseous hydrocarbon reactant employed is sufficient to provide 2 to 4 atoms of hydrogen per mole of chlorine.
7. The process of claim 1 in which the amount of gaseous hydrocarbon reactant employed is sufficient to provide 2 atoms of hydrogen per mole of chlorine.
8. The process of claim 2 in which the gaseous hydrocarbon used is methane and in an amount of 0.5 mole per mole of $Cl_2$ present.
9. The process of claim 1 in which free chlorine present in the gaseous reaction product is converted to a soluble chloride for removal from the process.

References Cited

UNITED STATES PATENTS 3,085,860  4/1963  Jacobowsky et al. __23—156 X

OSCAR R. VERTIZ, Primary Examiner.

E. C. THOMAS, Assistant Examiner.

U.S. Cl. X.R.

23—87, 155, 156, 204